(12) United States Patent
Zamora et al.

(10) Patent No.: US 11,254,481 B2
(45) Date of Patent: Feb. 22, 2022

(54) ENHANCEMENTS FOR TABBED SEAL (71) Applicant: Selig Sealing Products, Inc., Forrest, IL (US)

(72) Inventors: Rafael Zamora, Oberglatt (CH); Miteshkumar B. Patel, Basingstoke (GB)

(73) Assignee: Selig Sealing Products, Inc., Forrest, IL (US)

( * ) Notice: Subject to any disclaimer, the term of this patent is extended or adjusted under 35 U.S.C. 154(b) by 253 days.

(21) Appl. No.: 16/564,064

(22) Filed: Sep. 9, 2019

(65) Prior Publication Data

US 2020/0079561 A1 Mar. 12, 2020

Related U.S. Application Data

(60) Provisional application No. 62/729,844, filed on Sep. 11, 2018.

(51) Int. Cl.
*B65D 51/20* (2006.01)
*B65D 65/42* (2006.01)
*B65D 53/04* (2006.01)
*B65D 65/40* (2006.01)

(52) U.S. Cl.
CPC ............ *B65D 65/42* (2013.01); *B65D 51/20* (2013.01); *B65D 53/04* (2013.01); *B65D 65/40* (2013.01)

(58) Field of Classification Search
CPC ........ B65D 65/40; B65D 53/04; B65D 51/20; B65D 65/42; B65D 77/2032; B65D 77/2028; B65D 77/2024; B65D 77/5855
USPC .............................................. 220/270, 359.2
See application file for complete search history.

(56) References Cited

U.S. PATENT DOCUMENTS

| 1,818,379 | A | 8/1931 | Cain |
| 2,768,762 | A | 10/1956 | Guinet |
| 3,235,165 | A | 2/1966 | Jackson |
| 3,292,828 | A | 12/1966 | Stuart |
| 3,302,818 | A | 2/1967 | Balocca et al. |
| 3,460,310 | A | 8/1969 | Adcock et al. |
| 3,556,816 | A | 1/1971 | Nughes |
| 3,964,670 | A | 6/1976 | Amneus |
| 3,990,603 | A | 11/1976 | Brochman |
| 4,133,796 | A | 1/1979 | Bullman |
| 4,206,165 | A | 6/1980 | Dukess |
| 4,266,687 | A | 5/1981 | Cummings |

(Continued)

FOREIGN PATENT DOCUMENTS

| AT | 501393 A1 | 8/2006 |
| AT | 11738 U1 | 4/2011 |

(Continued)

OTHER PUBLICATIONS

European Patent Office, Extended European Search Report for European Patent Application No. 19196812.2 dated Feb. 21, 2020, 7 pages.

*Primary Examiner* — King M Chu
(74) *Attorney, Agent, or Firm* — Fitch, Even, Tabin & Flannery, LLP (57) ABSTRACT

Various enhancements of tabbed seals are provided herein with enhanced tab functionality. Such enhancements include a lacquer coating, such as one-part and two-part coatings, which can help minimize tab sticking to the lower laminate. Further, the lacquer can help decrease air bubbles under the tab and also provide visual enhancements to the tab.

15 Claims, 5 Drawing Sheets

(56) References Cited

U.S. PATENT DOCUMENTS

| | | |
|---|---|---|
| 4,396,655 A | 8/1983 | Graham |
| 4,556,590 A | 12/1985 | Martin |
| 4,582,735 A | 4/1986 | Smith |
| 4,588,099 A | 5/1986 | Diez |
| 4,595,116 A | 6/1986 | Carlsson |
| 4,596,338 A | 6/1986 | Yousif |
| 4,636,273 A | 1/1987 | Wolfersperger |
| 4,666,052 A | 5/1987 | Ou-Yang |
| 4,693,390 A | 9/1987 | Hekal |
| 4,735,335 A | 4/1988 | Torterotot |
| 4,741,791 A | 5/1988 | Howard |
| 4,762,246 A | 8/1988 | Ashley |
| 4,770,325 A | 9/1988 | Gordon |
| 4,771,903 A | 9/1988 | Levene |
| 4,781,294 A | 11/1988 | Croce |
| 4,801,647 A | 1/1989 | Wolfe, Jr. |
| 4,811,856 A | 3/1989 | Fischman |
| 4,818,577 A | 4/1989 | Ou-Yang |
| 4,837,061 A | 6/1989 | Smits |
| 4,863,061 A | 9/1989 | Moore |
| 4,867,881 A | 9/1989 | Kinzer |
| 4,889,731 A | 12/1989 | Williams |
| 4,934,544 A | 6/1990 | Han |
| 4,938,390 A | 7/1990 | Markva |
| 4,960,216 A | 10/1990 | Giles |
| 4,961,986 A | 10/1990 | Galda |
| 5,004,111 A | 4/1991 | McCarthy |
| 5,012,946 A | 5/1991 | McCarthy |
| 5,015,318 A | 5/1991 | Smits |
| 5,053,457 A | 10/1991 | Lee |
| 5,055,150 A | 10/1991 | Rosenfeld |
| 5,057,365 A | 10/1991 | Finkelstein |
| 5,071,710 A | 12/1991 | Smits |
| 5,089,320 A | 2/1992 | Straus |
| 5,098,495 A | 3/1992 | Smits |
| RE33,893 E | 4/1992 | Elias |
| 5,106,124 A | 4/1992 | Volkman |
| 5,125,529 A | 6/1992 | Torterotot |
| 5,131,556 A | 7/1992 | Iioka |
| 5,149,386 A | 9/1992 | Smits |
| 5,178,967 A | 1/1993 | Rosenfeld |
| 5,197,618 A | 3/1993 | Goth |
| 5,217,790 A | 6/1993 | Galda |
| 5,226,281 A | 7/1993 | Han |
| 5,261,990 A | 11/1993 | Galda |
| 5,265,745 A | 11/1993 | Pereyra |
| 5,433,992 A | 7/1995 | Galda |
| 5,513,781 A | 5/1996 | Ullrich |
| 5,514,442 A | 5/1996 | Galda |
| 5,560,989 A | 10/1996 | Han |
| 5,598,940 A | 2/1997 | Finkelstein |
| 5,601,200 A | 2/1997 | Finkelstein |
| 5,615,789 A | 4/1997 | Finkelstein |
| 5,618,618 A | 4/1997 | Murschall |
| 5,669,521 A | 9/1997 | Wiening |
| 5,683,774 A | 11/1997 | Faykish |
| 5,702,015 A | 12/1997 | Giles |
| 5,709,310 A | 1/1998 | Kretz |
| 5,776,284 A | 7/1998 | Sykes |
| 5,851,333 A | 12/1998 | Fagnant |
| 5,860,544 A | 1/1999 | Brucker |
| 5,871,112 A | 2/1999 | Giles |
| 5,887,747 A | 3/1999 | Burklin |
| 5,915,577 A | 6/1999 | Levine |
| 5,975,304 A | 11/1999 | Cain |
| 5,976,294 A | 11/1999 | Fagnant |
| 6,056,141 A | 5/2000 | Navarini |
| 6,082,566 A | 7/2000 | Yousif |
| 6,096,358 A | 8/2000 | Murdick |
| 6,131,754 A | 10/2000 | Smelko |
| 6,139,931 A | 10/2000 | Finkelstein |
| 6,158,632 A | 12/2000 | Ekkert |
| 6,194,042 B1 | 2/2001 | Finkelstein |
| 6,234,386 B1 | 5/2001 | Drummond |
| 6,290,801 B1 | 9/2001 | Krampe |
| 6,312,776 B1 | 11/2001 | Finkelstein |
| 6,361,856 B1 | 3/2002 | Wakai |
| 6,378,715 B1 | 4/2002 | Finkelstein |
| 6,458,302 B1 | 10/2002 | Shifflet |
| 6,461,714 B1 | 10/2002 | Giles |
| 6,544,615 B2 | 4/2003 | Otten |
| 6,548,302 B1 | 4/2003 | Mao |
| 6,602,309 B2 | 8/2003 | Vizulis |
| 6,627,273 B2 | 9/2003 | Wolf |
| 6,635,137 B2 | 10/2003 | Giles |
| 6,669,046 B1 | 12/2003 | Sawada |
| 6,699,566 B2 | 3/2004 | Zeiter |
| 6,705,467 B1 | 3/2004 | Kancsar |
| 6,722,272 B2 | 4/2004 | Jud |
| 6,767,425 B2 | 7/2004 | Meier |
| 6,790,508 B2 | 9/2004 | Razeti |
| 6,866,926 B1 | 3/2005 | Smelko |
| 6,902,075 B2 | 6/2005 | OBrien |
| 6,916,516 B1 | 7/2005 | Gerber |
| 6,955,736 B2 | 10/2005 | Rosenberger |
| 6,959,832 B1 | 11/2005 | Sawada |
| 6,974,045 B1 | 12/2005 | Trombach |
| 6,986,930 B2 | 1/2006 | Giles |
| 7,128,210 B2 | 10/2006 | Razeti |
| 7,182,475 B2 | 2/2007 | Kramer |
| 7,217,454 B2 | 5/2007 | Smelko |
| RE39,790 E | 8/2007 | Fuchs |
| 7,316,760 B2 | 1/2008 | Nageli |
| 7,448,153 B2 | 11/2008 | Maliner |
| 7,531,228 B2 | 5/2009 | Perre |
| 7,648,764 B2 | 1/2010 | Yousif |
| 7,713,605 B2 | 5/2010 | Yousif |
| 7,731,048 B2 | 6/2010 | Teixeira Alvares |
| 7,740,730 B2 | 6/2010 | Schedl |
| 7,740,927 B2 | 6/2010 | Yousif |
| 7,757,879 B2 | 7/2010 | Schuetz |
| 7,789,262 B2 | 9/2010 | Niederer |
| 7,798,359 B1 | 9/2010 | Marsella |
| 7,819,266 B2 | 10/2010 | Ross |
| 7,838,109 B2 | 11/2010 | Declerck |
| 7,850,033 B2 | 12/2010 | Thorstensen-Woll |
| 8,025,171 B2 | 9/2011 | Cassol |
| 8,057,896 B2 | 11/2011 | Smelko |
| 8,129,009 B2 | 3/2012 | Morris |
| 8,201,385 B2 | 6/2012 | McLean |
| 8,308,003 B2 | 11/2012 | O'Brien |
| 8,329,288 B2 | 12/2012 | Allegaert |
| 8,348,082 B2 | 1/2013 | Cain |
| 8,541,081 B1 | 9/2013 | Ranganathan |
| 8,703,265 B2 | 4/2014 | Thorstensen-Woll |
| 8,715,825 B2 | 5/2014 | Thorstensen-Woll |
| 8,852,725 B2 | 10/2014 | Sachs |
| 8,906,185 B2 | 12/2014 | McLean |
| 8,944,264 B2 | 2/2015 | Frishman |
| 9,028,963 B2 | 5/2015 | Thorstensen-Woll |
| 9,102,438 B2 | 8/2015 | Thorstensen-Woll |
| 9,193,513 B2 | 11/2015 | Thorstensen-Woll |
| 9,221,579 B2 | 12/2015 | Thorstensen-Woll |
| 9,227,755 B2 | 1/2016 | Thorstensen-Woll |
| 9,278,506 B2 | 3/2016 | McLean |
| 9,278,793 B2 | 3/2016 | Thorstensen-Woll |
| 9,440,765 B2 | 9/2016 | Thorstensen-Woll |
| 9,440,768 B2 | 9/2016 | Thorstensen-Woll |
| 9,533,805 B2 | 1/2017 | McLean |
| 9,676,513 B2 | 6/2017 | Thorstensen-Woll |
| 9,834,339 B2 | 12/2017 | Brucker |
| 9,994,357 B2 | 6/2018 | Thorstensen-Woll |
| 10,000,310 B2 | 6/2018 | Thorstensen-Woll |
| 10,150,590 B2 | 12/2018 | Thorstensen-Woll |
| 10,196,174 B2 | 2/2019 | Thorstensen-Woll |
| 10,259,626 B2 | 4/2019 | Thorstensen-Woll |
| 10,556,732 B2 | 2/2020 | Cassidy |
| 10,604,315 B2 | 3/2020 | Thorstensen-Woll |
| 10,899,506 B2 | 1/2021 | Thorstensen-Woll |
| 10,934,069 B2 | 3/2021 | Clark |
| 10,954,032 B2 | 3/2021 | Thorstensen-Woll |
| 11,059,644 B2 | 7/2021 | Cassidy |
| 2001/0023870 A1 | 9/2001 | Mihalov |
| 2001/0031348 A1 | 10/2001 | Jud |

(56) References Cited

U.S. PATENT DOCUMENTS

| | | |
|---|---|---|
| 2002/0028326 A1 | 3/2002 | Lhila |
| 2002/0068140 A1 | 6/2002 | Finkelstein |
| 2003/0087057 A1 | 5/2003 | Blemberg |
| 2003/0108714 A1 | 6/2003 | Razeti |
| 2003/0168423 A1 | 9/2003 | Williams |
| 2003/0196418 A1 | 10/2003 | O'Brien |
| 2004/0013862 A1 | 1/2004 | Brebion |
| 2004/0028851 A1 | 2/2004 | Okhai |
| 2004/0043165 A1 | 3/2004 | Van Hulle |
| 2004/0043238 A1 | 3/2004 | Wuest |
| 2004/0109963 A1 | 6/2004 | Zaggia |
| 2004/0197500 A9 | 10/2004 | Swoboda |
| 2004/0211320 A1 | 10/2004 | Cain |
| 2005/0003155 A1 | 1/2005 | Huffer |
| 2005/0048307 A1 | 3/2005 | Schubert |
| 2005/0100718 A1 | 5/2005 | Peiffer |
| 2005/0208242 A1 | 9/2005 | Smelko |
| 2005/0208244 A1 | 9/2005 | Delmas |
| 2005/0218143 A1 | 10/2005 | Niederer |
| 2005/0279814 A1 | 12/2005 | Drummond |
| 2006/0000545 A1 | 1/2006 | Nageli |
| 2006/0003120 A1 | 1/2006 | Nageli |
| 2006/0003122 A1 | 1/2006 | Nageli |
| 2006/0068163 A1 | 3/2006 | Giles |
| 2006/0124577 A1 | 6/2006 | Ross |
| 2006/0151415 A1 | 7/2006 | Smelko |
| 2006/0278665 A1 | 12/2006 | Bennett |
| 2007/0003725 A1 | 1/2007 | Yousif |
| 2007/0007229 A1 | 1/2007 | Yousif |
| 2007/0014897 A1 | 1/2007 | Ramesh |
| 2007/0065609 A1 | 3/2007 | Korson |
| 2007/0267304 A1 | 11/2007 | Portier |
| 2007/0298273 A1 | 12/2007 | Thies |
| 2008/0026171 A1 | 1/2008 | Gullick |
| 2008/0073308 A1 | 3/2008 | Yousif |
| 2008/0103262 A1 | 5/2008 | Haschke |
| 2008/0135159 A1 | 6/2008 | Bries |
| 2008/0145581 A1 | 6/2008 | Tanny |
| 2008/0156443 A1 | 7/2008 | Schaefer |
| 2008/0169286 A1 | 7/2008 | McLean |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll |
| 2009/0078671 A1 | 3/2009 | Triquet |
| 2009/0208729 A1 | 8/2009 | Allegaert |
| 2009/0304964 A1 | 12/2009 | Sachs |
| 2010/0009162 A1 | 1/2010 | Rothweiler |
| 2010/0030180 A1 | 2/2010 | Deckerck |
| 2010/0047552 A1 | 2/2010 | McLean |
| 2010/0059942 A1 | 3/2010 | Rothweiler |
| 2010/0116410 A1 | 5/2010 | Yousif |
| 2010/0155288 A1 | 6/2010 | Harper |
| 2010/0170820 A1 | 7/2010 | Leplatois |
| 2010/0193463 A1 | 8/2010 | OBrien |
| 2010/0213193 A1 | 8/2010 | Helmlinger |
| 2010/0221483 A1 | 9/2010 | Gonzalez Carro |
| 2010/0279041 A1 | 11/2010 | Mathew |
| 2010/0290663 A1 | 11/2010 | Trassl |
| 2010/0314278 A1 | 12/2010 | Fonteyne |
| 2011/0000917 A1 | 1/2011 | Wolters |
| 2011/0005961 A1 | 1/2011 | Leplatois |
| 2011/0089177 A1 | 4/2011 | Thorstensen-Woll |
| 2011/0091715 A1 | 4/2011 | Rakutt |
| 2011/0100949 A1 | 5/2011 | Grayer |
| 2011/0100989 A1 | 5/2011 | Cain |
| 2011/0138742 A1 | 6/2011 | McLean |
| 2011/0147353 A1 | 6/2011 | Kornfeld |
| 2011/0152821 A1 | 6/2011 | Kornfeld |
| 2012/0000910 A1 | 1/2012 | Ekkert |
| 2012/0043330 A1 | 2/2012 | McLean |
| 2012/0067896 A1 | 3/2012 | Daffner |
| 2012/0070636 A1 | 3/2012 | Thorstensen-Woll |
| 2012/0103988 A1 | 5/2012 | Wiening |
| 2012/0111758 A1 | 5/2012 | Lo |
| 2012/0241449 A1 | 9/2012 | Frischmann |
| 2012/0285920 A1 | 11/2012 | McLean |
| 2012/0288693 A1* | 11/2012 | Stanley ............ B32B 27/34 428/213 |
| 2012/0312818 A1 | 12/2012 | Ekkert |
| 2013/0020324 A1 | 1/2013 | Thorstensen-Woll |
| 2013/0020328 A1 | 1/2013 | Duan |
| 2013/0045376 A1 | 2/2013 | Chen |
| 2013/0121623 A1 | 5/2013 | Lyzenga |
| 2013/0177263 A1 | 7/2013 | Duan |
| 2013/0248410 A9* | 9/2013 | Spallek ............ B32B 27/10 206/528 |
| 2014/0001185 A1 | 1/2014 | McLean |
| 2014/0061196 A1 | 3/2014 | Thorstensen-Woll |
| 2014/0061197 A1 | 3/2014 | Thorstensen-Woll |
| 2014/0186589 A1 | 7/2014 | Chang |
| 2014/0224800 A1 | 8/2014 | Thorstensen-Woll |
| 2014/0284331 A1 | 9/2014 | Thorstensen-Woll |
| 2014/0326727 A1 | 11/2014 | Jouin |
| 2015/0053680 A1 | 2/2015 | Masato |
| 2015/0131926 A1 | 5/2015 | Lux |
| 2015/0158643 A1 | 6/2015 | Coker |
| 2015/0197385 A1 | 7/2015 | Wei |
| 2015/0225116 A1 | 8/2015 | Thorstensen-Woll |
| 2015/0321808 A1 | 11/2015 | Thorstensen-Woll |
| 2016/0001952 A1* | 1/2016 | Kulkarni ............ B65D 79/02 428/172 |
| 2016/0159546 A1 | 6/2016 | Cassidy |
| 2016/0185485 A1 | 6/2016 | Thorstensen-Woll |
| 2016/0325896 A1 | 11/2016 | Thorstensen-Woll |
| 2017/0173930 A1 | 6/2017 | McLean |
| 2017/0253373 A1 | 9/2017 | Thorstensen-Woll |
| 2017/0259978 A1 | 9/2017 | Zamora |
| 2017/0291399 A1 | 10/2017 | Bourgeois |
| 2018/0079576 A1 | 3/2018 | Cassidy |
| 2018/0118439 A1 | 5/2018 | Thorstensen-Woll |
| 2019/0055070 A1 | 2/2019 | Brown |
| 2019/0092520 A1 | 3/2019 | Thorstensen-Woll |
| 2019/0225369 A1 | 7/2019 | Thorstensen-Woll |
| 2019/0276209 A1 | 9/2019 | Clark |
| 2021/0188489 A1 | 6/2021 | Thorstensen-Woll |

FOREIGN PATENT DOCUMENTS

| | | |
|---|---|---|
| BR | 8200231 U | 9/2003 |
| BR | 0300992 A | 11/2004 |
| CA | 2015992 A1 | 1/1991 |
| CA | 2203744 A1 | 10/1997 |
| CA | 2297840 A1 | 2/1999 |
| CN | 1301289 A | 6/2001 |
| CN | 1639020 A | 7/2005 |
| CN | 103193026 A | 7/2013 |
| CN | 104853994 A | 8/2015 |
| DE | 102006030118 B3 | 5/2007 |
| DE | 10204281 A1 | 8/2007 |
| DE | 102007022935 B4 | 4/2009 |
| DE | 202009000245 U1 | 4/2009 |
| EP | 0135431 A1 | 3/1985 |
| EP | 0577432 A1 | 1/1994 |
| EP | 0668221 A1 | 8/1995 |
| EP | 0826598 A2 | 3/1998 |
| EP | 0826599 A2 | 3/1998 |
| EP | 0905039 A1 | 3/1999 |
| EP | 0717710 B1 | 4/1999 |
| EP | 0915026 A1 | 5/1999 |
| EP | 0706473 B1 | 8/1999 |
| EP | 1075921 A2 | 2/2001 |
| EP | 1199253 A2 | 4/2002 |
| EP | 0803445 B1 | 11/2003 |
| EP | 1462381 A1 | 9/2004 |
| EP | 1199253 B1 | 3/2005 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |

(56) References Cited

FOREIGN PATENT DOCUMENTS

| | | | |
|---|---|---|---|
| EP | 1918094 A1 | 5/2008 |
| EP | 1935636 A1 | 6/2008 |
| EP | 1968020 A1 | 9/2008 |
| EP | 1992476 A1 | 11/2008 |
| EP | 2014461 A1 | 1/2009 |
| EP | 2230190 A1 | 9/2010 |
| EP | 2292524 A1 | 3/2011 |
| EP | 2599735 A1 | 6/2013 |
| EP | 2230190 B1 | 8/2014 |
| FR | 2916157 A1 | 11/2008 |
| FR | 2943322 A1 | 9/2010 |
| GB | 1216991 A | 12/1970 |
| GB | 2353986 A | 3/2001 |
| GB | 2501967 A | 11/2013 |
| JP | H09110077 A | 4/1997 |
| KR | 100711073 B1 | 4/2007 |
| KR | 100840926 B1 | 6/2008 |
| KR | 100886955 B1 | 3/2009 |
| MX | 05002905 A | 2/2006 |
| MX | 2010001867 A | 4/2010 |
| TW | 201217237 A | 5/2012 |
| WO | 9702997 A1 | 1/1997 |
| WO | 9905041 A1 | 2/1999 |
| WO | 0066450 A1 | 11/2000 |
| WO | 2005009868 A1 | 2/2005 |
| WO | 2005030860 A1 | 4/2005 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008113855 A1 | 9/2008 |
| WO | 2008118569 A2 | 10/2008 |
| WO | 2008125784 A1 | 10/2008 |
| WO | 2008125785 A1 | 10/2008 |
| WO | 2008148176 A1 | 12/2008 |
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |
| WO | 2013134665 A1 | 9/2013 |
| WO | WO-2013134665 A1 * | 9/2013 | ........... B65D 55/026 |
| WO | 2014190395 A1 | 12/2014 |
| WO | 2015119988 A1 | 8/2015 |
| WO | 2017155946 A1 | 9/2017 |
| WO | WO-2017155940 A1 * | 9/2017 | ........... A61K 31/661 |

* cited by examiner

FIG. 7

ENHANCEMENTS FOR TABBED SEAL

CROSS-REFERENCE TO RELATED APPLICATIONS

This application claims benefit of U.S. Provisional Application No. 62/729,844, filed Sep. 11, 2018, which is hereby incorporated herein by reference in its entirety.

FIELD

The disclosure relates to pull-tab sealing members for sealing the mouth of a container, and more particularly, to pull-tab sealing members wherein a tab is enhanced to minimize the tab from sticking.

BACKGROUND

It is often desirable to seal the opening of a container using a removable or peelable seal, sealing member, or inner seal. Often a cap or other closure is then screwed or placed over the container opening capturing the sealing member therein. In use, a consumer typically removes the cap or other closure to gain access to the sealing member and then removes or otherwise peels the seal from the container in order to dispense or gain access to its contents.

Initial attempts at sealing a container opening utilized an induction- or conduction-type inner seal covering the container's opening where the seal generally conformed to the shape of the opening such that a circular container opening was sealed with a round disk approximately the same size as the opening. These prior seals commonly had a lower heat activated sealing layer to secure a periphery of the seal to a rim or other upper surface surrounding the container's opening. Upon exposing the seal to heat, the lower layer bonded to the container's rim. In many cases, these seals included a foil layer capable of forming induction heat to activate the lower heat seal layer. These prior seals tended to provide good sealing, but were often difficult for a consumer to remove because there was nothing for the consumer to grab onto in order to remove the seal. Often, the consumer needed to pick at the seal's edge with a fingernail because there was little or no seal material to grasp.

Other types of seals for containers include a side tab or other flange that extended outwardly from a peripheral edge of the seal. These side tabs are generally not secured to the container rim and provide a grasping surface for a consumer to hold and peel off the seal. These side tabs, however, extend over the side of the container rim and often protrude into a threaded portion of the closure. If the side tab is too large, this configuration may negatively affect the ability of the seal to form a good heat seal. The side tabs (and often the seal itself) can be deformed or wrinkled when the closure or other cap is placed on the container due to contact between the closure (and threads thereof) and tabbed part of the seal. To minimize these concerns, the side tabs are often very small; thus, providing little surface area or material for a consumer to grasp in order to remove the seal.

Yet other types of seals include a sealing member having a tab defined on the top of the seal. One approach of these prior seals includes a partial layer of coated pressure sensitive adhesive to secure the tab to a layer of metal foil. The tab was formed by a full layer extending across the entire surface of the sealing member, but the full layer was only bonded to half of the seal to form the tab. This type of top-tabbed seal offered the advantage of a larger tab, which provided more grasping area for the consumer to hold and peel off the seal, but required a full additional layer of material in order to form the tab. In other approaches, the seal may include a tab formed from the additional full layer of film combined with an additional full layer of adhesive utilizing a part paper or part polymer layer, called a tab stock, to form the tab. This part layer is inserted between the additional full layer of adhesive and lower seal portions to prevent the tab from sticking to the layers below, which formed the tab.

However, even in these tabbed forms, the tab may still be difficult for a user to grasp to remove the seal. For example, the tab may stick to other layers in the seal and therefore not be readily graspable by a user. The tab may become stuck during the installation and heating of the seal, during storage, and the like. Furthermore, depending on the specific materials used for certain layers of the seal, the tab may be more susceptible to sticking. Certain polymers when used near the tab may be more susceptible to sticking to the tab. Similarly, the materials chosen for the tab may also impact the amount of tab stick.

There have been some attempts at minimizing tab stick, such as by using a surface roughened layer for the tab or adjacent the tab to decrease the contacted surface area. Further, certain forms of release layers have been attempted, such as using silicone based materials. However, these release layers can be expensive and may need to be applied in specific manners.

Additionally, there have been other difficulties with tabbed seals such as when bubbles form under the tab. In some forms, the tab is generally not adhered to one of the upper and lower laminate portions to permit a user to grasp the tab. However, because this portion of the seal is not adhered fully, the tab can shift, bubbles can form under the tab, and other problems can occur.

SUMMARY

Various enhancements of tabbed seals are provided herein with enhanced tab functionality, such as to decrease tab stick and other tab related problems. The below described embodiments may be used separately or may be used with two or more of the enhancements in combination with one another.

According to one form, a tabbed sealing member for sealing to a rim surrounding a container opening is provided. The sealing member includes a multi-layer laminate an upper laminate portion partially bonded to a lower laminate portion forming a gripping tab defined wholly within a perimeter of the sealing member. The gripping tab is configured for removing the sealing member from the container opening. The lower laminate portion is positioned below the gripping tab and includes at least a heat seal layer for bonding to the container rim. The tabbed sealing member also includes a lacquer material on at least one of a portion of a lower surface of the tab and a portion of an upper surface of the lower laminate.

In accordance with one form, a laminate for forming a tabbed sealing member is provided. The laminate includes a lower laminate portion, an upper laminate portion, and a lacquer material. The lower laminate portion has an upper surface and including at least a heat seal layer. The upper laminate portion has a lower surface partially bonded to the upper surface of the lower laminate. The lower and upper laminate portions including a non-bonded area that is configured to form a tab when the laminate is formed into the tabbed sealing member. The lacquer material is on at least a portion of one of the lower surface of the upper portion and the upper surface of the lower laminate.

According to one form, the lacquer material is positioned on a portion of the underside of the tab.

In one form, the lacquer material comprises at least one of an acrylic based material, polyurethane based material, polyamide-based material, nitrocellulose-based material, and combinations thereof.

In accordance with one form, the lacquer material comprises a silica additive.

According to one form, the lacquer coating is a one-part coating.

In one form, the lacquer coating is a two-part coating.

In accordance with one form, the lacquer material, when dry, has a weight of between about 0.5 and about 2.5 g/m2.

According to one form, the lacquer material has a glossy finish.

In accordance with one form, the lacquer material has a matte finish.

In one form, the tabbed seal includes a coating that is positioned on a bottom surface of the gripping tab. In one form, the tab includes a functional lacquer which prevents the inside of the tab from sticking on an upper surface of the lower laminate. The coating can include a lacquer which is at least one of acrylic based, polyurethane based, polyamide based, nitrocellulose based, and combinations thereof. The lacquer can be a one-part or a two-part material. Further, the lacquer can heave a glossy and/or a matte finish. According to one form, it is a two-part matte finish. Further, the coating weight when dry can be between about 0.5-2.5 g/m$^2$. In one form, the coating weight is about 1.6 g/m$^2$. In one form, the tabbed seal appears as a glossy material wherein the lacquer is a one-part lacquer having a coating weight of 0.5-1 g/m$^2$ and in some forms, about 0.8 g/m$^2$.

Some tabs included release coatings to prevent the tab from adhering to the lower laminate but also avoid coatings which are too slippery, which would have otherwise prevented a user from adequately grasping the seal. The coating may be applied to at least a portion of the gripping tab to enhance a user's ability to grasp and maintain a hold of the gripping tab. In other words, the applied coating and/or lacquer should decrease tab stick but also not be too slippery that it becomes difficult for a user to grasp the tab for removing the seal.

In a similar form, the gripping tab may include a polymer adhesive layer on at least a portion of at least one of an upper and a lower surface of the gripping tab. The polymer adhesive layer may provide a tackier gripping surface so that the gripping tab is less slippery. However, the polymer adhesive layer should also be configured such that it does not prevent the gripping tab from releasing from the lower laminate portion. In this regard, a lacquer can be included on an opposite surface to decrease sticking from the polymer adhesive layer.

In yet another form, the gripping tab may be enhanced by including embossing and/or texturizing. This type of enhancement can be positioned on at least one of an upper and a lower surface of the gripping tab. In yet another portion, this type of enhancement may be configured to extend entirely through the gripping tab from the upper surface to the lower surface. For example, the gripping tab may be embossed in a process such that the entire structure of the gripping tab includes a texture. However, embossing can cause tab sticking if the adjacent surface is soft, such as a foam. In this regard, a lacquer can be applied to decrease the chance that the embossed surface from sticks.

These and other aspects may be understood more readily from the following description and the appended drawings.

DETAILED DESCRIPTION

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

A pull tab sealing member for a container is described herein containing an upper laminate having a pull tab bonded to a lower laminate capable of being heat sealed to a container's mouth or opening.

For simplicity, this disclosure generally may refer to a container or bottle, but the sealing members herein may be applied to any type of container, bottle, package or other apparatus having a rim or mouth surrounding an access opening to an internal cavity. In this disclosure, reference to upper and lower surfaces and layers of the components of the sealing member refers to an orientation of the components as generally depicted in figures and when the sealing member is in use with a container in an upright position and having an opening at the top of the container. Different approaches to the sealing member will first be generally described, and then more specifics of the various constructions and materials will be explained thereafter. It will be appreciated that the sealing members described herein, in some cases, function in both a one-piece or two-piece sealing member configuration. A one-piece sealing member generally includes just the sealing member bonded to a container rim. A cap or closure may be also used therewith. A two-piece sealing member includes the sealing member temporarily bonded to a liner. In this construction, the sealing member is bonded to a container's rim, and the liner is configured to separate from the sealing member during heating to be retained in a cap or other closure used on the container. In a two-piece construction, a wax layer, for example, may be used to temporarily bond the sealing member to a liner. Other types of releasable layers may also be used to provide a temporary bond between the seal and liner, but the releasable layers are generally heat activated.

As discussed above, tabbed seals can suffer from problems associated with a user's ability to properly grasp the tab. Tabbed sealing members have been modified as described herein to improve functionality beyond the current product lines offered. In one form, the tab includes a functional lacquer which prevents the inside of the tab from sticking on an upper surface of the lower laminate. The lacquer may also provide additional features, as discussed below.

Figure 1:
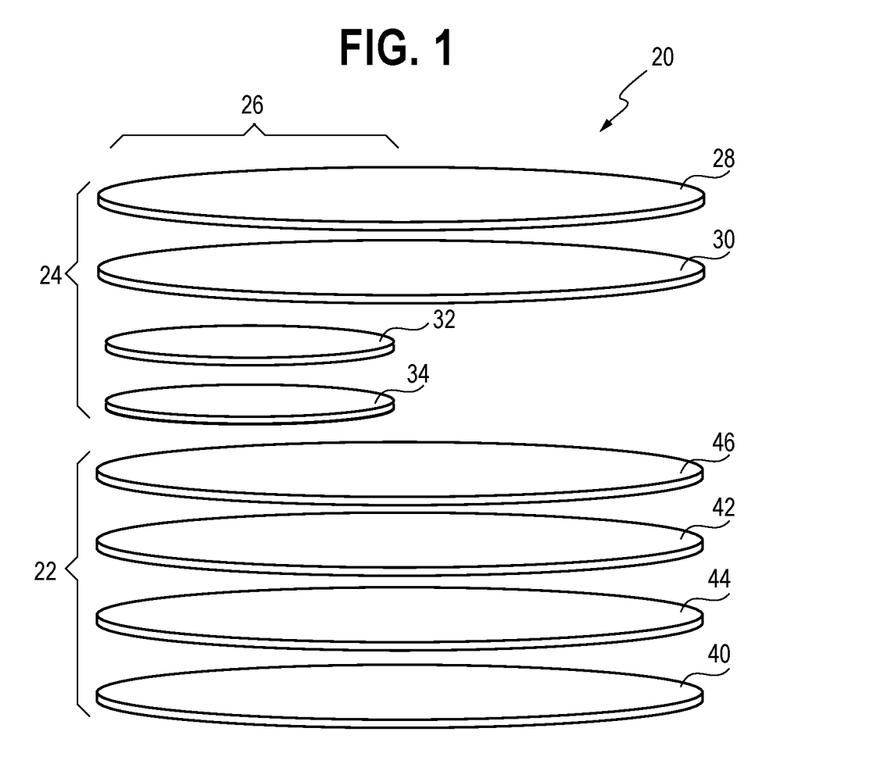
FIG. 1 is an exploded view of a tabbed seal having a lacquered coating on an underside of the tab.

A first form of enhanced gripping tab is generally shown in FIG. 1 and includes a lacquer material, which may be in the form of a coating. More specifically, a tabbed sealing member 20 is shown having a lower laminate portion 22 and an upper laminate portion 24 partially bonded thereto. In one form, a free tab portion 26 is formed whereby the upper laminate portion 24 is not bonded to the lower laminate portion 22. In this form, the free tab portion 26 may be grasped by a user to remove the tabbed sealing member 20 from a container.

As shown in FIG. 1, in one form, the upper laminate portion 24 can include an upper layer 28 and an adhesive layer 30. Further, the upper laminate portion 24 can include a tab layer 32. The upper layer 28 can include a variety of different materials to provide different functionalities, as desired. For example, the upper layer 28 can be a support layer, providing strength to the upper laminate portion 24 so as to decrease tearing of the upper laminate portion 24. In this form, the upper layer 24 can include a variety of materials, including, but not limited to polymer film materials. The upper layer 24 can also provide insulating properties, such as in the form of polymer films, polymer foam, combinations thereof, and the like. The adhesive layer 30 may be a separate layer, as found in FIG. 1, or may form a part of the upper layer 28. For example, the upper layer 30 may be dual purpose, providing adhesive properties and other properties. Further, the adhesive layer 30 may be coextruded with the upper layer 28, such that they form generally a single layer of material. It should be appreciated that the upper laminate portion 24 may also include additional layers, such as a plurality of one or more of polymer films, polymer foams, adhesives, and the like.

In the form shown in FIG. 1, the upper laminate portion 24 also includes a lacquer 34 that has been applied to at least a portion of the tab layer 32. The lacquer 34 can take a variety of form, such as layers, coatings, films, and the like. The lacquer 34 can include a variety of materials including, but not limited to, materials the minimize the tab adhering between the upper and lower laminate portions 24, 22, while also not being too slippery that a user cannot adequately grasp the tab for removing the seal. In this regard, prior release coatings have been used to minimize a tab from adhering to the lower laminate. However, these release coatings are oftentimes too slippery such that a user has difficulty properly grasping the tab.

The lacquer 34 may include a variety of different materials including, but not limited to, a lacquer which is at least one of acrylic based, polyurethane based, polyamide based, nitrocellulose based, polyester based lacquers, polyvinyl-chloride (PVC) based lacquers, UV curing lacquers, and combinations thereof. The lacquer can be a one-part or a two-part material. In one form, when the lacquer will contact a polymer film, a two-part lacquer may be preferred. When the lacquer will contact a polymer foam, a one part lacquer may be used. However, the different two-part and one-part materials may be used to contact any types of materials and polymers.

In one form, a two-part lacquer may be configured to provide better grip to user than a one part lacquer. Further, the lacquer can have a glossy and/or a matte finish. According to one form, it is a two-part matte finish and includes a silica additive. In one form, the matte finish is no longer transparent and provides a unique appearance compared to prior transparent tabs.

Further, the coating weight when dry can be between about 0.5-2.5 g/m$^2$. In one form, the coating weight is about 1.6 g/m$^2$. The coating can be applied across the entire surface area of the seal, across the exposed portion under the tab, or just a portion of the exposed surface under the tab.

The lacquer 34 may also include a combination of materials. For instance, the lacquer may be a two-part lacquer that includes silica additives such that the resulting lacquer has a matte finish. The lacquer may also be used in a variety of thicknesses as desired and in view of the number and thicknesses of other coatings and layers used in the seal.

The use of lacquer 34, such as on the underside of the tab 26 can provide a releasable tab, yet still a grippable surface. However, it should be appreciated that the lacquer 34 can be used on one or more of the upper and lower surfaces of the gripping tab or portions thereof. The gripping tab 26 is generally defined by the upper three layers on the left hand side of FIG. 1, whereby the right hand side of the upper two layers is adhered to the lower laminate portion 22.

The lower laminate portion 22 may include any number of different layers, laminates, coatings, adhesives, and the like. In one form, such as shown in FIG. 1, the lower laminate portion 22 includes a seal layer 40, such as a heat seal, pressure sensitive adhesive, and the like. The lower laminate portion 22 may also include a membrane layer 42. The membrane layer 42 can provide a variety of different functions, such as a moisture barrier, oxygen barrier, and induction heating layer. When using heat to adhere the tabbed seal 20 to a container, the membrane layer 42 may take the form of a metal foil to provide heat to the seal layer 40 during an induction heating operation.

The lower laminate portion may include other layers, such as polymer layer 44 and bonding layer 46. In one form, the polymer layer 44 may be a polymer film, such as a PET film between the seal layer 40 and the membrane layer 42. The polymer layer 44 may take a variety of other forms, such as a polymer foam and the like. The polymer layer 46 may similarly take a variety of forms such as foams, films, and the like. In one form, polymer layer 46 may be a polyolefin layer, such as a polyolefin film and/or foam.

It should be appreciated that the number and type of layers in the lower laminate may be modified as desired. This may include having fewer or greater layers than those found in FIG. 1 as well as changing the relative positioning of each layer.

Figure 2:
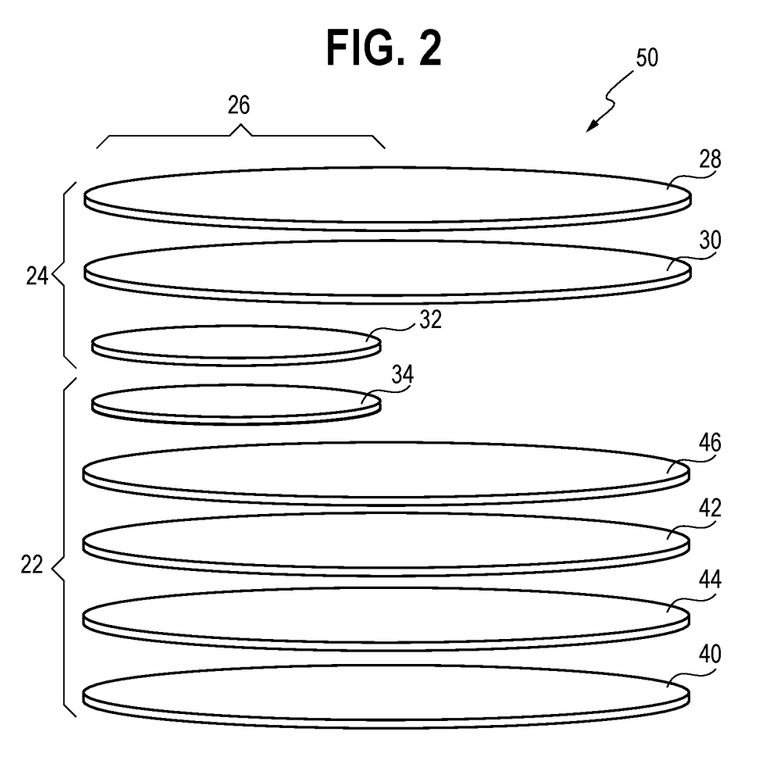
FIG. 2 is an exploded view of a tabbed seal having a lacquered coating on an upper surface of a portion of the lower laminate of the seal.

Referring now to FIG. 2, a similar embodiment is shown having similar layers and/or coatings. As these layers may be the same and/or similar to those in FIG. 1, common reference numbers will be used. As shown in FIG. 2, tabbed seal 50 is shown having a lacquer 34 included on a portion of the lower laminate 22, such as on the polymer layer. In this form, lacquer 34 is positioned on the upper surface of at least a portion of the lower laminate 22. The lacquer 34 may be the same lacquer as described above. In other forms, the lacquer coating may be modified so as to suitably bond with the lower laminate materials.

Just as with the first embodiment, the embodiment shown in FIG. 2 includes specific layers and configuration of layers, it should be appreciated that lacquer may be used with a variety of different layers and configurations of layers for tabbed seals.

Figure 3:
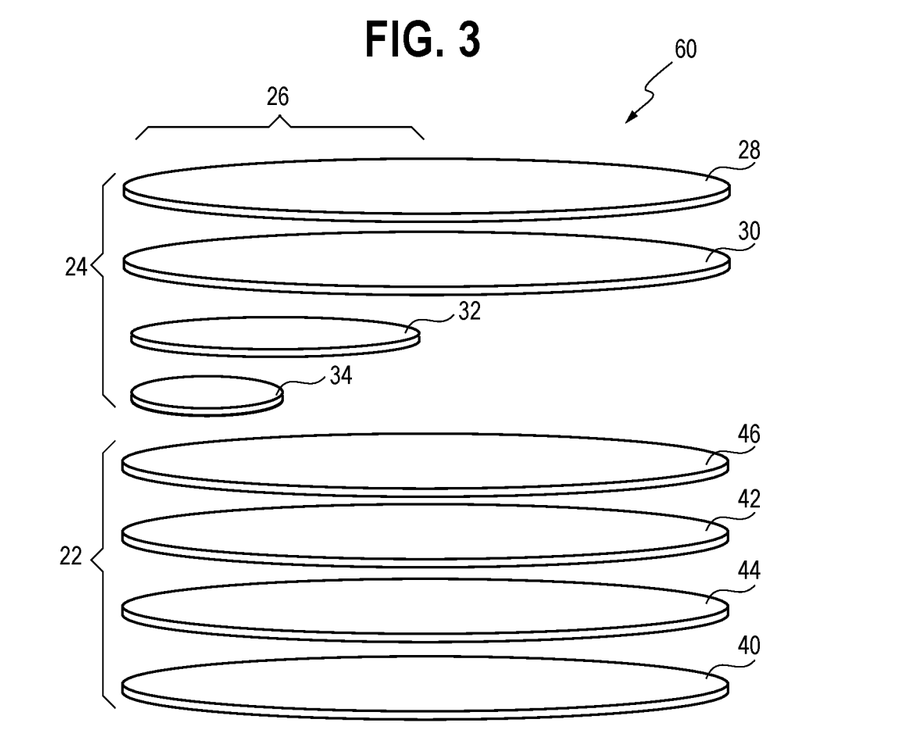
FIG. 3 is an exploded view of a tabbed seal having a lacquered coating on a portion of the tab.

FIG. 3 illustrates yet another embodiment utilizing a lacquer. Tabbed seal 60 includes the lacquer 34 positioned on a portion of the surface of the tab layer 32. In this form, the outer edge of the tab 32 includes the lacquer 34 which permits the peripheral edge of the tab 32 to be easily lifted from the lower laminate. Further, in some forms, depending on the amount of lacquer 34 used, the edge may be somewhat thicker and therefore easier to grip.

Figure 4:
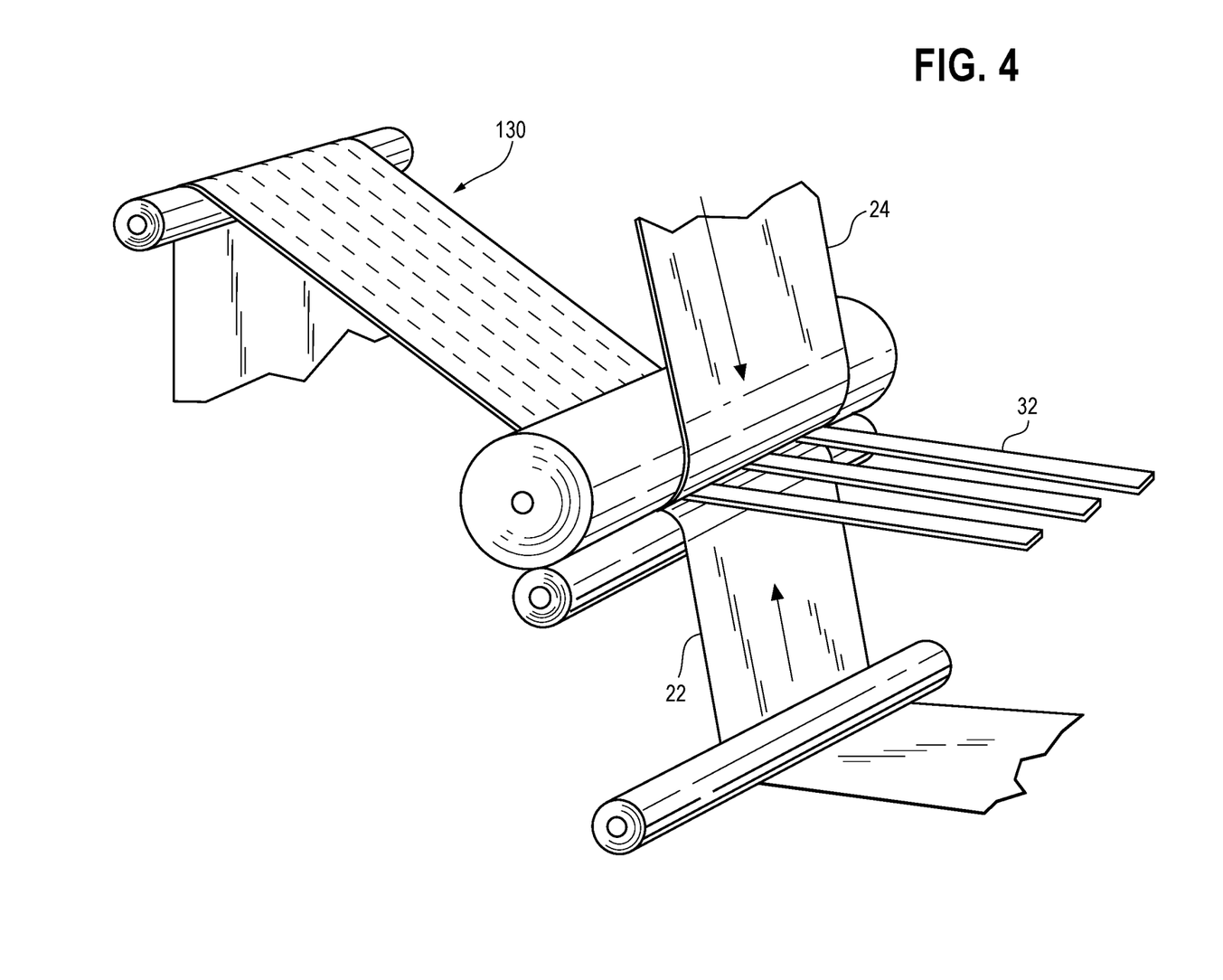
FIG. 4 is a perspective view of one form of assembling a laminate used to form a tabbed sealing member.

The sealing members herein may be formed from laminates whereby the laminates are slit and or cut into the final sealing members. FIG. 4 illustrates one form of assembling a laminate used to form a sealing member. In this form, the upper laminate portion 24 is joined with the lower laminate portion 22 with the tab layer 32 therebetween to form a laminate 130. The laminate 130 can then be slit and/or cut to form the individual sealing members. The individual sealing members can take a variety of shapes, such as disc shaped.

The lacquer may be used in seals regardless of the smoothness or roughness of the layers therein. For example, if the lower laminate includes an upper foam layer and the tab has a somewhat rough surface, the tab may more readily adhere into the softer surface of the foam layer. By including a lacquer coating, the chance that the tab adheres to the foam may be decreased. Similarly, the upper and lower laminate portions may include materials that generally stick together, especially when heated and/or when pressure is applied. For example, the tab may be formed from a polymer film material while the lower laminate may have a similar polymer film material as the upper surface. In this form, the two surfaces may cause sticking. By including a lacquer between the surfaces, tab stick may be decreased.

Further, the lacquer may be used to provide a variety of additional functionalities and properties. For example, the lacquer may be a two-part lacquer that has a matte finish. The matte finish may be provided in a number of manners, such as through silica additives. The matte finish may be used to provide visual benefits such as making the tab more readily identifiable, providing distinct markings as evidence of origin of the materials, and the like. The matte finish may also provide better grip for the user.

In other forms, the lacquer may be used to help maintain the non-adhered portions of the upper and lower laminates flat, relative to one another. The lacquer can eliminate the glass-plate effect through the rough surface. As mentioned above, in the tabbed seals herein, at least a portion of the upper and lower laminates are not adhered together during manufacture and installation. Typically, a wide laminate comprising the upper and lower laminate portions is formed and then disc shaped seals are cut therefrom. In one form, strips of non-adhered portions are provided along the width of the laminate. As the laminate is being transported, slit, and then cut to form the tabbed seals, air bubbles can form in the non-adhered portions. This can cause a variety of problems during cutting. Further, the air bubbles can also create problems when the cut seals are installed into lids and/or onto containers. This can cause misalignment of the tabs and other problems. By using a lacquer, it has surprisingly been found that the amount and size of air bubbles in the non-bonded portion can be decreased. This is because the softer lacquer coating enables a homogenous surface contact between the tab, which can have a high relative stiffness, and the base membrane. In other words, the lacquer may be softer than the film onto which it is applied. In some forms, the one-part lacquers provide a suitable softness to perform this function.

In some forms, the lacquer may also provide other benefits. For instance, the lacquer may cause the force required to lift the tab from the membrane to be consistent. Some prior tabs required varying levels of force across the surface area of the tab to lift the tab. The lacquer may result in a generally even lifting force that is needed.

In yet another form of tab enhancement at least a portion of the tab is texturized and/or embossed. Other tabbed sealing members may also be used with texturizing and/or embossing.

Texturization or embossing of one or more layers in the upper laminate, such as the insulating layer, imparts a textured surface to the liner. Depending on the depth and geometry of the embossed pattern various degrees of grip enhancement can be imparted. The depth and geometry of the pattern can be varied, as desired. The depth may also be varied depending on the overall desired thickness of the seal, the thickness of the layers in the tab, the grip of the tab, and the like.

For example, one or more of polymer layers can be embossed or otherwise be provided with a surface roughness. By embossing the polymer layer(s), the non-smooth resulting surface may help impart desired roll release properties to the laminate and help minimize blocking when it is unwound prior to cutting into individual seals. Further, the grain or surface roughness, in some approaches, tends to reduce the surface contact between the outer layer and any liner or cap applied over the sealing member. This grain or surface roughness tends to result in a reduction in removal force of a cap or adjacent liner (in a two-piece seal) in view of the decreased surface contact between the outer layer and any adjacent surface cap or liner surface. Therefore, the embossed surface cannot only enhance the user's ability to grasp the tab, but may also enhance other production processes, as described above.

Further, as noted above, the lacquer coating may prevent the embossed surface from adhering to other layers, such as a lower foam layer. In this form, the lacquer coating can help minimize the tab sticking.

Just as with the other embodiments described herein, the embossed features can be used with a variety of layers and combinations thereof, when used in a tabbed seal.

The lower seal portion and upper seal portion may include a variety of different materials and layers. For instance, the lower seal portion may include a metal foil, and the top surface of the lower seal portion may be the metal foil. The lower seal portion may also include a foamed polymer, or the top surface of the lower seal portion may be a polymer film selected from polyolefin materials and polyester materials.

Additional layers may be included in the upper and/or lower laminate such as polyethylene terephthalate (PET), nylon, or other structural polymer layer and may be, in some approaches, about 0.5 to about 1 mil thick. In some approaches, additional layers may be included in the lower laminate. It should be appreciated that the lower seal laminate may include any number of other layers, such as polymer layers, adhesives, polymer films, polymer foams and the like.

The lower sealant or heat seal layer may be composed of any material suitable for bonding to the rim of a container, such as, but not limited to, induction, conduction, or direct bonding methods. Suitable adhesives, hot melt adhesives, or sealants for the heat sealable layer include, but are not limited to, polyesters, polyolefins, ethylene vinyl acetate, ethylene-acrylic acid copolymers, surlyn, and other suitable materials. By one approach, the heat sealable layer may be a single layer or a multi-layer structure of such materials about 0.2 to about 3 mils thick. By some approaches, the heat seal layer is selected to have a composition similar to and/or include the same polymer type as the composition of the container. For instance, if the container includes polyethylene, then the heat seal layer would also contain polyethylene. If the container includes polypropylene, then the heat seal layer would also contain polypropylene. Other similar materials combinations are also possible.

The polymer layers used in the upper and/or lower laminates may take a variety of forms such as coatings, films, foams, and the like. Suitable polymers include but are not limited to, polyethylene, polypropylene, ethylene-propylene copolymers, blends thereof as well as copolymers or blends with higher alpha-olefins. By one approach, one or more of the polymer layers may be a blend of polyolefin materials, such as a blend of one or more high density polyolefin components combined with one or more lower density polyolefin components. In one form, one polymer layer may be a polyethylene film while another polymer layer may be a PET film. According to one form, the polyethylene film may have a thickness of about 5 to about 20 microns while the PET film may have a thickness of about 5 to about 20 microns.

A support layer may be optional in the laminate. If included, it may be polyethylene terephthalate (PET), nylon, or other structural polymer layer and may be, in some approaches, about 0.5 to about 1 mil thick.

The membrane layer may be one or more layers configured to provide induction heating and/or barrier characteristics to the seal. A layer configured to provide induction heating is any layer capable of generating heat upon being exposed to an induction current where eddy currents in the layer generate heat. By one approach, the membrane layer may be a metal layer, such as, aluminum foil, tin, and the like. In other approaches, the membrane layer may be a polymer layer in combination with an induction heating layer. The membrane layer may also be or include an atmospheric barrier layer capable of retarding the migration of gases and moisture at least from outside to inside a sealed container and, in some cases, also provide induction heating at the same time. Thus, the membrane layer may be one or more layers configured to provide such functionalities. By one approach, the membrane layer is about 0.3 to about 2 mils of a metal foil, such as aluminum foil, which is capable of providing induction heating and to function as an atmospheric barrier.

In some forms, the seals may include an insulation layer or a heat-redistribution layer. In one form, the insulation layer may be a foamed polymer layer. Suitable foamed polymers include foamed polyolefin, foamed polypropylene, foamed polyethylene, and polyester foams. In some forms, these foams generally have an internal rupture strength of about 2000 to about 3500 g/in. In some approaches, the foamed polymer layer 106 may also have a density less than 0.6 g/cc and, in some cases, about 0.4 to less than about 0.6 g/cc. In other approaches, the density may be from about 0.4 g/cc to about 0.9 g/cc. The foamed polymer layer may be about 1 to about 5 mils thick.

In other approaches, a non-foam heat distributing or heat re-distributing layer may be included. In such approach, the non-foam heat distributing film layer is a blend of polyolefin materials, such as a blend of one or more high density polyolefin components combined with one or more lower density polyolefin components. Suitable polymers include but are not limited to, polyethylene, polypropylene, ethylene-propylene copolymers, blends thereof as well as copolymers or blends with higher alpha-olefins. By one approach, the non-foam heat distributing polyolefin film layer is a blend of about 50 to about 70 percent of one or more high density polyolefin materials with the remainder being one or more lower density polyolefin materials. The blend is selected to achieve effective densities to provide both heat sealing to the container as well as separation of the liner from the seal in one piece.

The heat-activated bonding layer may include any polymer materials that are heat activated or heated to achieve its bonding characteristics or application to the seal. By one approach, the heat-activated bonding layer may have a density of about 0.9 to about 1.0 g/cc and a peak melting point of about 145° F. to about 155° F. A melt index of the bonding layer 120 may be about 20 to about 30 g/10 min. (ASTM D1238). Suitable examples include ethylene vinyl acetate (EVA), polyolefin, 2-component polyurethane, ethylene acrylic acid copolymers, curable two-part urethane adhesives, epoxy adhesives, ethylene methacrylate copolymers, polybutylene, combinations thereof, and the like bonding materials.

The adhesives useful for any of the adhesive or tie layers described herein include, for example, ethylene vinyl acetate (EVA), polyolefins, 2-component polyurethane, ethylene acrylic acid copolymers, curable two-part urethane adhesives, epoxy adhesives, ethylene methacrylate copolymers, polybutylene, combinations thereof, and the like bonding materials. Other suitable materials may include low density polyethylene, ethylene-acrylic acid copolymers, and ethylene methacrylate copolymers. By one approach, any optional adhesive layers may be a coated polyolefin adhesive layer. If needed, such adhesive layers may be a coating of about 0.2 to about a 0.5 mil (or less) adhesive, such as coated ethylene vinyl acetate (EVA), polyolefins, 2-component polyurethane, ethylene acrylic acid copolymers, curable two-part urethane adhesives, epoxy adhesives, ethylene methacrylate copolymers and the like bonding materials.

In one aspect, the tab may be formed by a full layer or partial layer of material combined with a partial width composite adhesive structure that includes a polyester core with upper and lower adhesives on opposite sides thereof. This partial composite adhesive structure bonds the upper laminate to the lower laminate to form the gripping tab.

In other aspects of this disclosure, the upper laminate of the seal does not extend the full width of the sealing member in order to define the gripping tab. To this end, the pull-tab sealing members herein may also combine the advantages of a tabbed sealing member with a large gripping tab defined completely within the perimeter of the seal, but achieve such functionality with less material (in view of the part layers of the upper laminate) and permit such a tab structure to be formed on many different types of pre-formed lower laminates. The partial upper laminate structure is advantageous, in some approaches, for use with a seal configured for large or wide mouth containers, such as containers with an opening from about 30 to about 100 mm (in other approaches, about 60 to about 100 mm). These seals may also be used with 38 mm or 83 mm container openings, or can be used with any sized container.

In further aspects of this disclosure, the sealing members herein may include a pull or grip tab defined in the upper laminate portion wholly within a perimeter or circumference of the sealing member wherein an upper surface of the sealing member is partially defined by the upper laminate portion and partially defined by the lower laminate portion. In one approach of this aspect, the top surface of the sealing member is provided by a minor portion of the upper laminate and a major portion of the lower laminate. In other approaches of this aspect, the lower laminate is partially exposed at a top surface of the seal with about 50 percent to about 75 percent (or more) of the lower laminate exposed at the top surface of the entire seal. The seals of this aspect allow consumers to remove the sealing member using the tab (as in a conventional pull-tab seal) and/or puncture the sealing member by piercing the exposed lower laminate portion to provide push/pull functionality depending on the preference of the consumer.

In the various embodiments, the seals of the present disclosure defining a tab wholly within a perimeter or circumference of the seal (formed by a full or partial layer) also provide an improved ability for the tabbed sealing member to function in a two-piece seal and liner combination. In a two-piece seal and liner combination, the tabbed sealing member is temporarily adhered across its top surface to a liner. After container opening and removal of a cap or closure, the sealing member stays adhered to the container mouth and the liner separates and remains in the container's cap.

In some prior versions of two-piece seal and linear assemblies, the bottom layer of the sealing member is a heat seal layer that is activated by heating, such as by induction or conduction heating, in order to adhere or bond an outer periphery of the sealing member to a rim surrounding the mouth of a container. In the two-piece seal and liner combination, an upper surface of the sealing member is temporarily adhered to a lower surface of the liner by a release layer, which is often a heat-activated release layer, such as an intervening wax layer. During heating to bond the sealing member to the container, heat not only activates the lower heat seal layer, but also travels upwardly through the seal to melt the intervening wax across the entire surface of the sealing member to separate the liner from the sealing member. Often, the melted wax is absorbed by the liner in order to permit easy liner separation from the sealing member. As can be appreciated, for this sealing member and liner combination to function properly, the intervening wax layer needs to be melted across the entire surface of the sealing member. If the wax is not melted evenly all the way across the sealing member upper surface, the liner may not properly separate from the lower seal portion.

The various layers of the sealing member are assembled via coating adhesives, applying films, and/or a heat lamination process forming a sheet of the described layers. Extrusion lamination may also be used. The resulting laminate sheet of the sealing members can be cut into appropriate sized disks or other shapes as needed to form a vessel closing assembly or tabbed sealing member. The cut sealing member is inserted into a cap or other closure which, in turn, is applied to the neck of a container to be sealed. The screw cap can be screwed onto the open neck of the container, thus sandwiching the sealing member between the open neck of the container and the top of the cap. The sealing layer may be a pressure sensitive adhesive, the force of attaching the closure to the container can activate the adhesive.

EXAMPLES

A number of samples were run to test the lacquer coating to determine if the coating helped minimize tab stick. Samples were run on a Federal 10 head capper with a linear pick off. The samples were run at 100 bottles per minute with a capping torque of 0.8-1.0 Nm.

The line was monitored running on caps with standard Selig L&P foil, capping was good with only the occasional cocked cap seen. Random bottles were taken from the line after the Enercon and tested for seal and peel. All seals were good with no leakers found but the peel was quite hard and the occasional foil ripped and stuck to the bottle when peeled but most were good. The hard seal was due to the Enercon being at 100% power but no alterations were made.

The sorter was run out and the trial caps with the experimental samples were run on exactly the same settings and conditions. Random bottles were taken from the line and again tested for seal and peel.

The seal was extremely good and no leakers were seen. However, as with the standard foil, the peel was hard due to the Enercon setting at 100% and some foil stuck to the bottle when peeled but the majority were fine.

On a previous trial on the same line the tab was difficult to separate from the foil layer when peeling off. With the experimental samples, no such issues were seen. The tab separation was not a problem and could be lifted easily when peeling the foil off even with the worst case scenario of the Enercon being set at 100%.

4000 caps were run. Over 100 random bottle samples were removed from the line and tested for seal and peel, all were good with no leakers seen. The seal was generally on the hard side but still removable and the tab easily lifted when peeling the foil off. No settings had to be adjusted and the foil performance was comparable to the standard foil.

Figure 5:
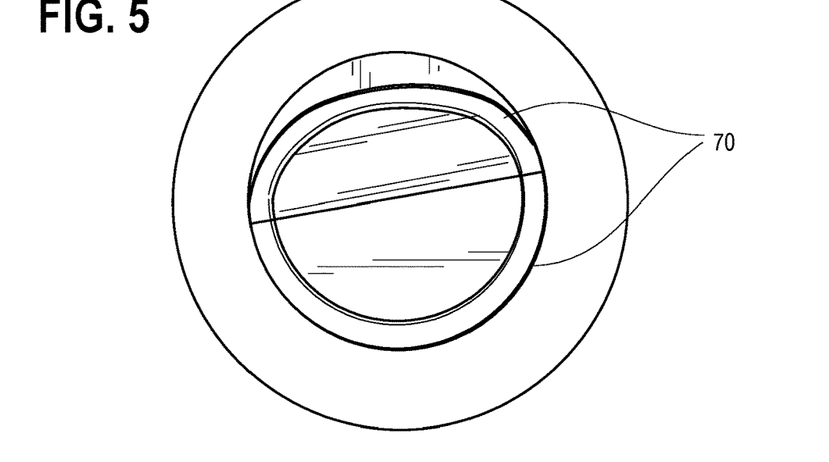
FIG. 5 is a top view of a tabbed seal on a container.
Figure 6:
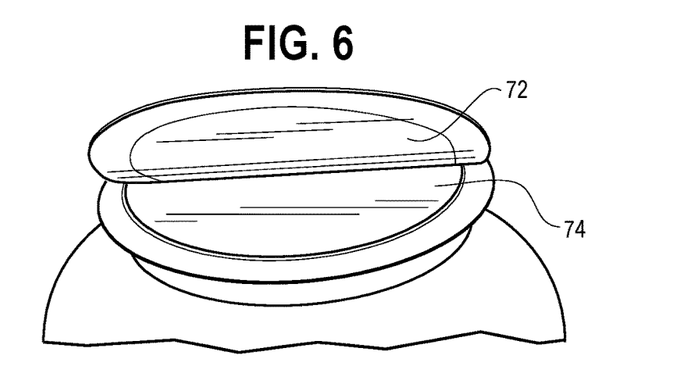
FIG. 6 is a perspective view of a tabbed seal on a container illustrating a tab portion that has separated from the lower laminate portion.

FIGS. 5 and 6 illustrate seals that were applied whereby there was no tab stick between the tab and the lower laminate portion. More specifically, as shown in FIG. 5, a cool even seal 70 resulted at the land area of the container. Further, as found in FIG. 6, the tab 72 was easily lifted and separated from the lower laminate portion 74 such that a user could readily grasp the tab 72 for removal of the seal.

Figure 7:
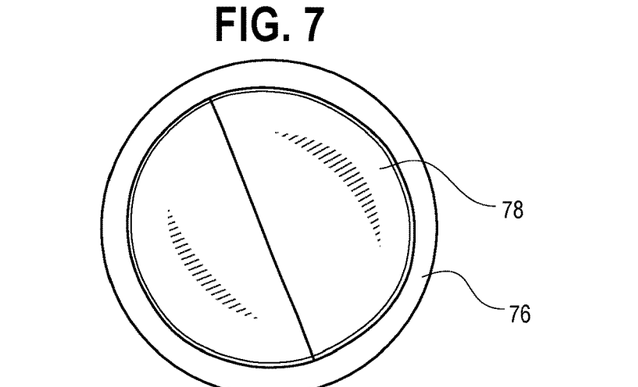
FIG. 7 is a bottom view of tabbed seals after removal from a container.

FIG. 7 illustrates even adhesion of the seal layer 76 such that the seal layer 76 and seal 78 are easily and evenly removable from the container.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of Applicant's contribution. The actual scope of the protection sought is intended to be defined in the following claims when viewed in their proper perspective based on the prior art.

What is claimed is:

1. A tabbed sealing member for sealing to a rim surrounding a container opening, the sealing member comprising:
   a multi-layer laminate including an upper laminate portion partially bonded to a lower laminate portion forming a gripping tab defined wholly within a perimeter of the sealing member, the gripping tab for removing the sealing member from the container opening;
   the lower laminate portion positioned below the gripping tab and including at least a heat seal layer for bonding to the container rim; and
   a lacquer material on at least one of a portion of a lower surface of the tab and a portion of an upper surface of the lower laminate, the lacquer material having a matte finish.

2. The tabbed sealing member of claim 1 wherein the lacquer material is positioned on a portion of the underside of the tab.

3. The tabbed sealing member of claim 1 wherein the lacquer material comprises at least one of an acrylic based material, polyurethane based material, polyamide-based material, nitrocellulose-based material, and combinations thereof.

4. The tabbed sealing member of claim 1 wherein the lacquer material comprises a silica additive.

5. The tabbed sealing member of claim 1 wherein the lacquer coating is a one-part coating.

6. The tabbed sealing member of claim 1 wherein the lacquer coating is a two-part coating.

7. The tabbed sealing member of claim 1 wherein the lacquer material, when dry, has a weight of between about 0.5 and about 2.5 g/m$^2$.

8. The tabbed sealing member of claim 1 wherein the lower laminate portion further includes an induction heating member.

9. A laminate for forming a tabbed sealing member, the laminate comprising:
   a lower laminate portion having an upper surface and including at least a heat seal layer and an induction heating layer; and
   an upper laminate portion having a lower surface partially bonded to the upper surface of the lower laminate, the lower and upper laminate portions including a non-bonded area that is configured to form a tab when the laminate is formed into the tabbed sealing member,
   a lacquer material on at least a portion of one of the lower surface of the upper portion and the upper surface of the lower laminate, the lacquer material having a matte finish.

10. The laminate of claim 9 further comprising a tab layer in the upper laminate wherein the lacquer material is on at least a portion of the tab layer.

11. The laminate of claim 9 wherein the lacquer material comprises at least one of an acrylic-based material, polyurethane-based material, polyamide-based material, nitrocellulose-based material, and combinations thereof.

12. The laminate of claim 9 wherein the lacquer material comprises a silica additive.

13. The laminate of claim 9 wherein the lacquer coating is a one-part coating.

14. The laminate of claim 9 wherein the lacquer coating is a two-part coating.

15. The laminate of claim 9 wherein the lacquer material, when dry, has a weight of between about 0.5 and about 2.5 g/m$^2$.

* * * * *